United States Patent [19]

Corbic nee Busnel

[11] 4,003,490
[45] Jan. 18, 1977

[54] PROCESS AND APPARATUS FOR THE MANUFACTURE OF WHITE CHEESE OR YOGHURT

[75] Inventor: Bernadette Corbic née Busnel, Carrieres-sur-Seine, France

[73] Assignee: Societe: Toscara Anstalt, Vaduz, Liechtenstein

[22] Filed: Dec. 23, 1974

[21] Appl. No.: 535,843

[30] Foreign Application Priority Data

Jan. 9, 1974 France ............................ 74.00718
Apr. 10, 1974 France ............................ 74.12664

[52] U.S. Cl. ............................ 220/22.3; 220/20.5; 210/514; 210/521
[51] Int. Cl.² .................. B65D 85/00; B01D 43/00
[58] Field of Search ............ 220/22, 20, 22.1, 22.2, 220/22.3, 22.4, 90.4, 20.5; 206/527; 210/514, 521

[56] References Cited

UNITED STATES PATENTS

| 621,711 | 3/1899 | Richardson | 220/20 |
|---|---|---|---|
| 2,067,830 | 1/1937 | DePew | 220/22 X |
| 2,486,932 | 11/1949 | Elliot | 220/22.1 |
| 2,529,114 | 11/1950 | Tellier | 220/90.4 |
| 3,360,161 | 12/1967 | Smith | 220/90.4 |
| 3,485,412 | 12/1969 | Hawley | 229/1.5 B X |

FOREIGN PATENTS OR APPLICATIONS 1,346,309 10/1962 France

Primary Examiner—William Price
Assistant Examiner—Steven M. Pollard
Attorney, Agent, or Firm—Lewis H. Eslinger

[57] ABSTRACT

This invention relates to the manufacture of white cheese or yoghurt. In accordance with the invention, a coagulatable milk composition is coagulated in one chamber of a container having two intercommunicating chambers. After coagulation of the milk composition, the orientation of the container is changed so that serum liberated during the coagulation in one chamber drains from the curds into the other chamber. The curds are prevented from passing from one chamber to the other by a divider which serves to define the two chambers and provide communication passages between the chambers. The present invention enables white cheese or yoghurt to be formed in the container from which it is to be consumed, without necessitating handling of pre-formed white cheese or yoghurt during packaging.

10 Claims, 35 Drawing Figures

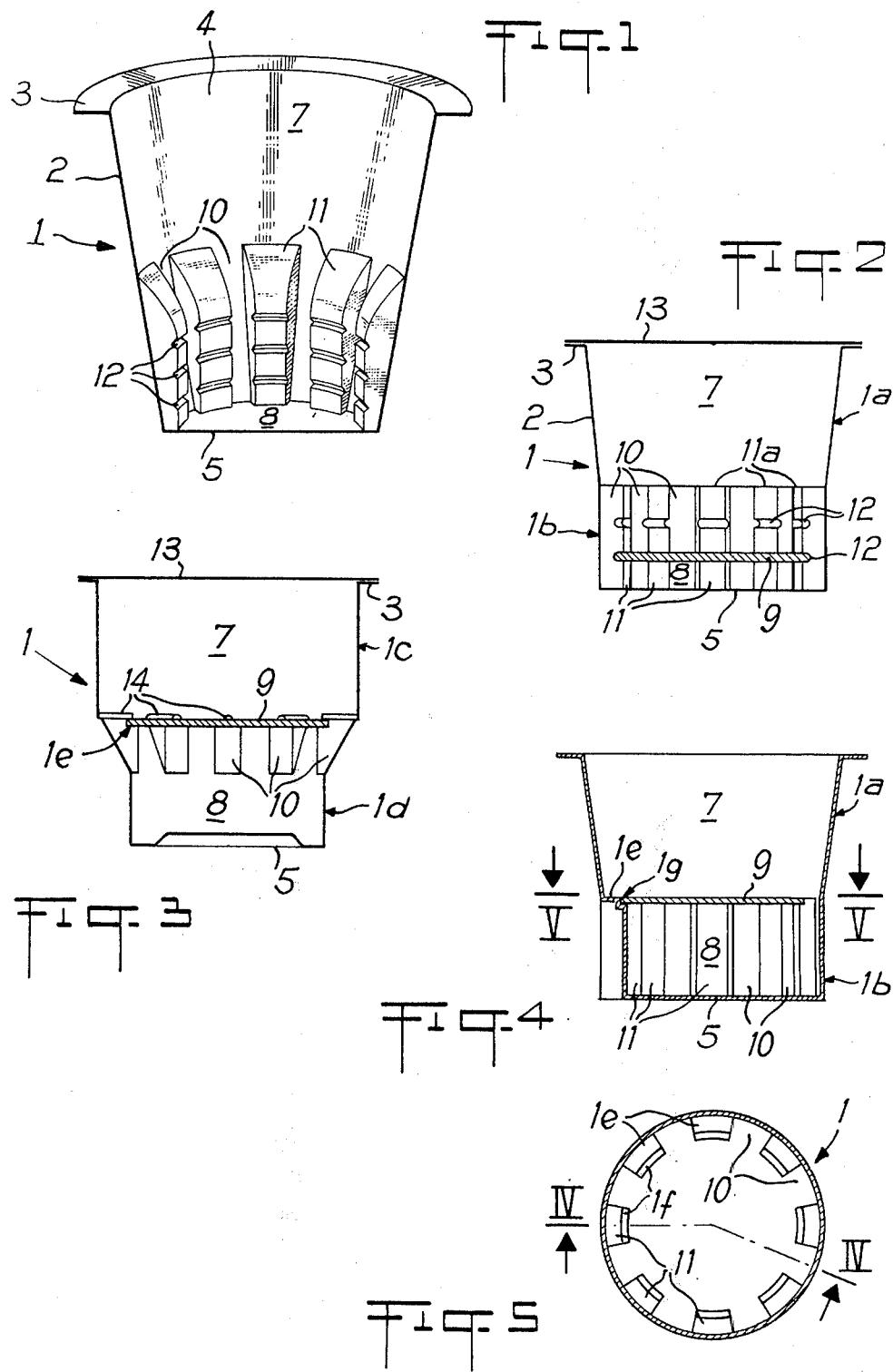

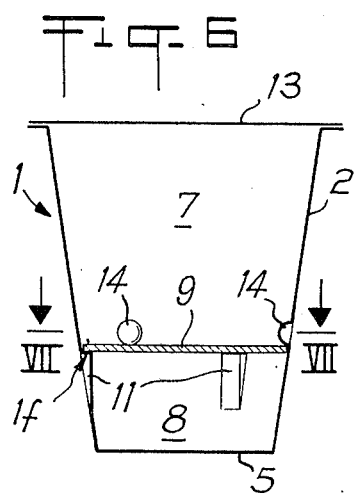
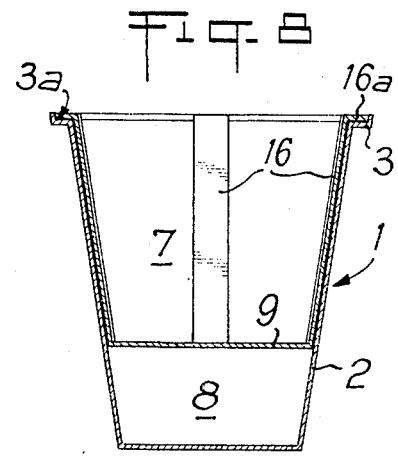
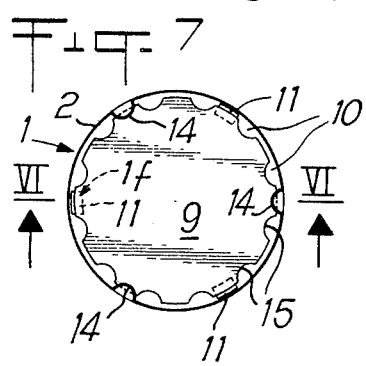
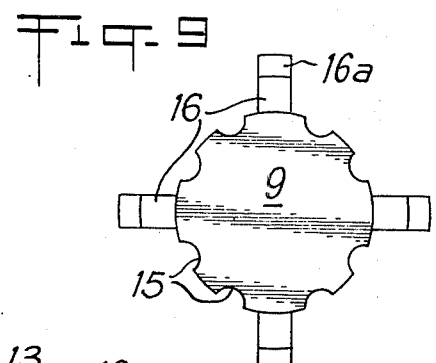
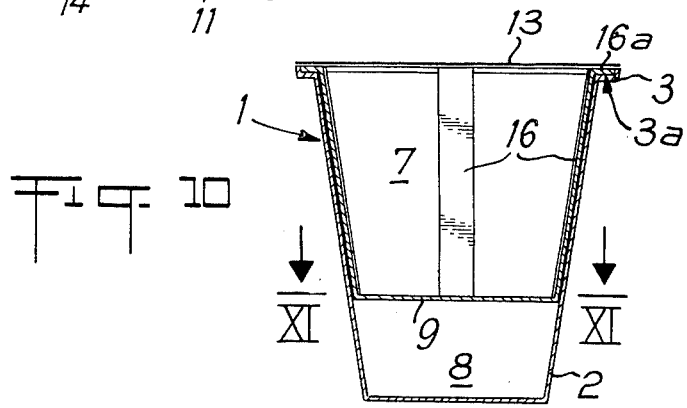
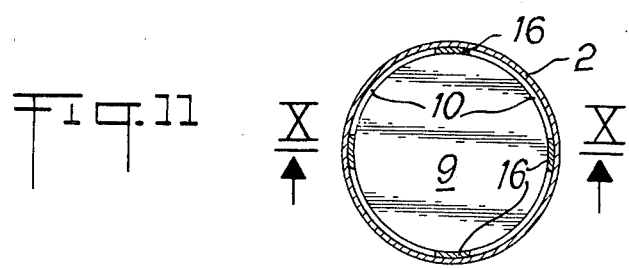

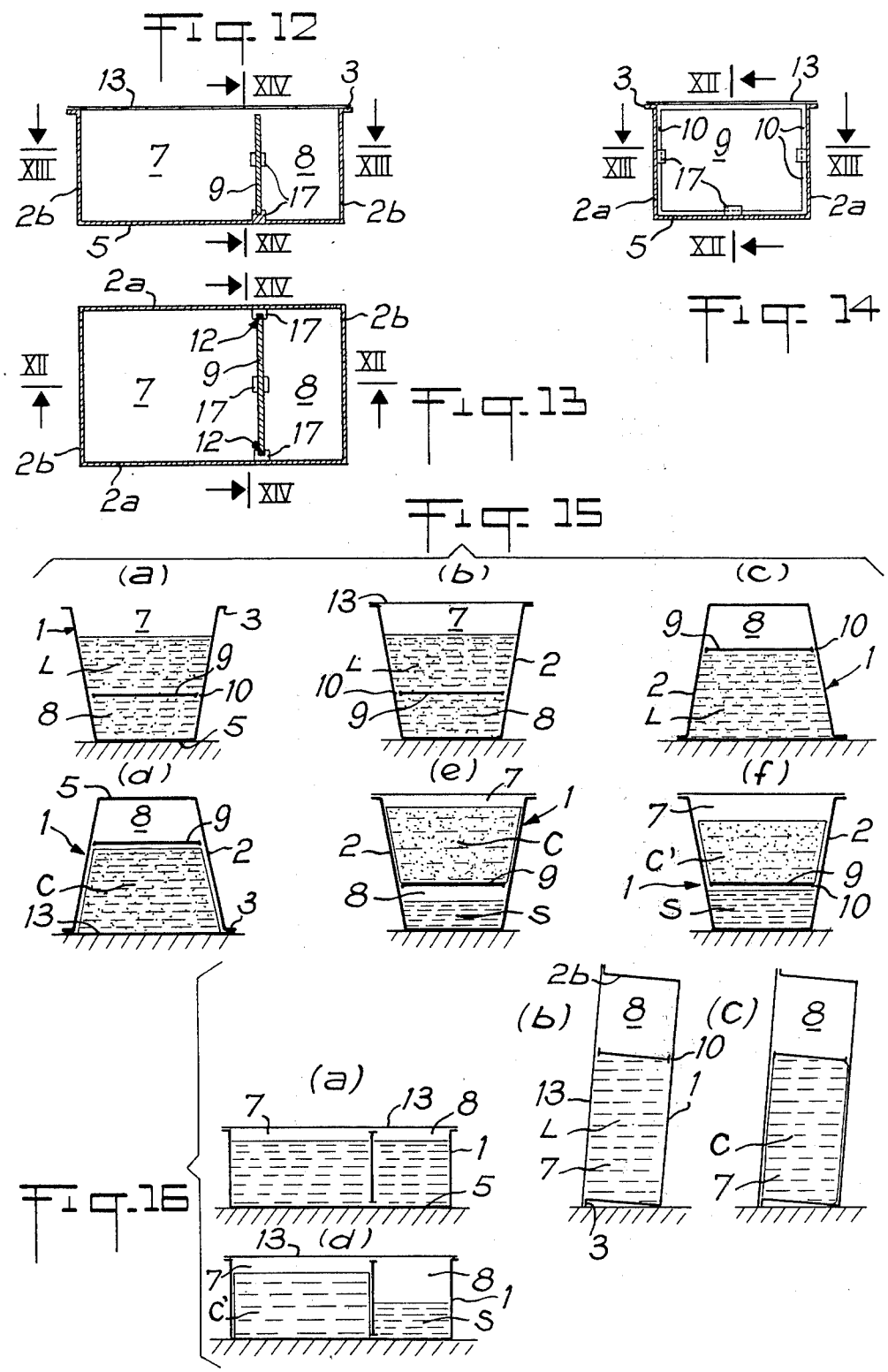

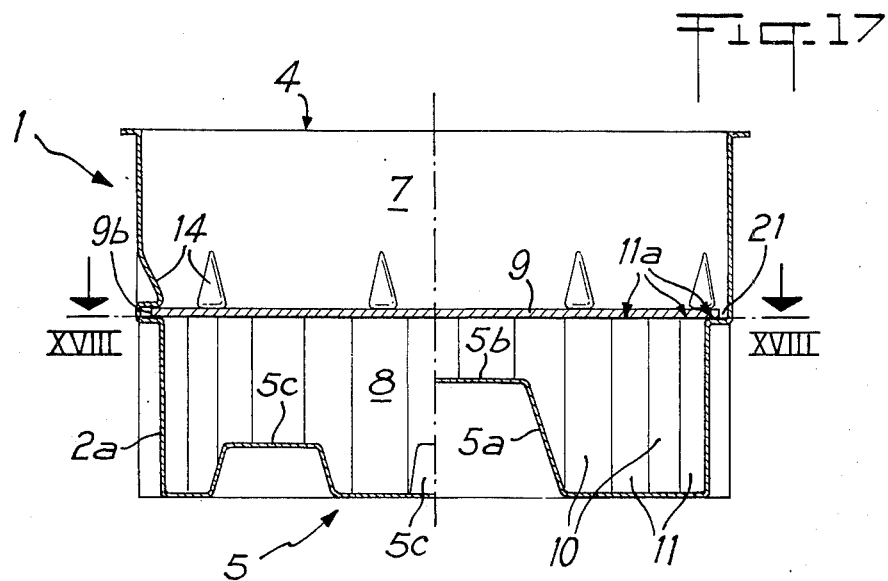
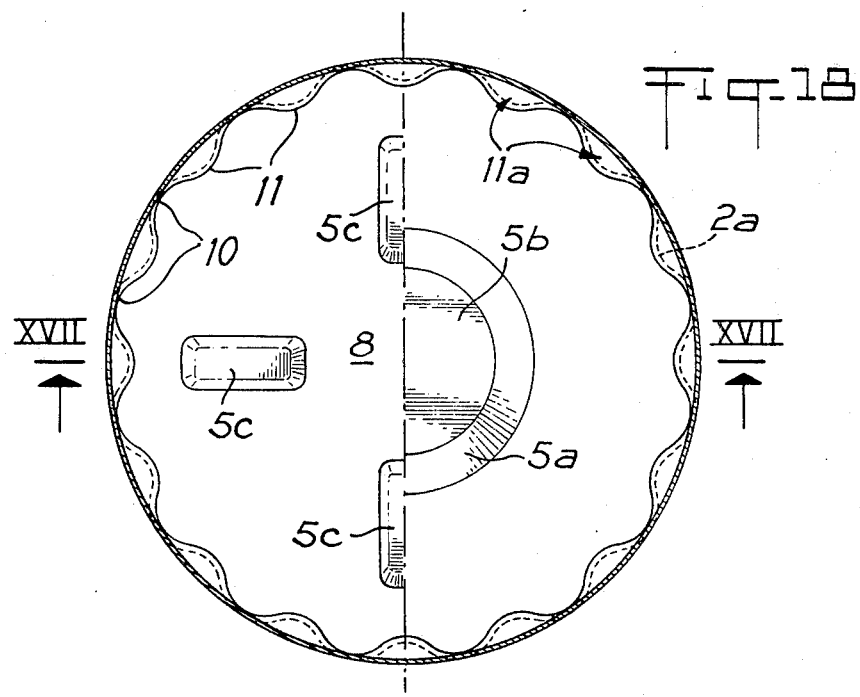

U.S. Patent    Jan. 18, 1977    Sheet 5 of 6    4,003,490
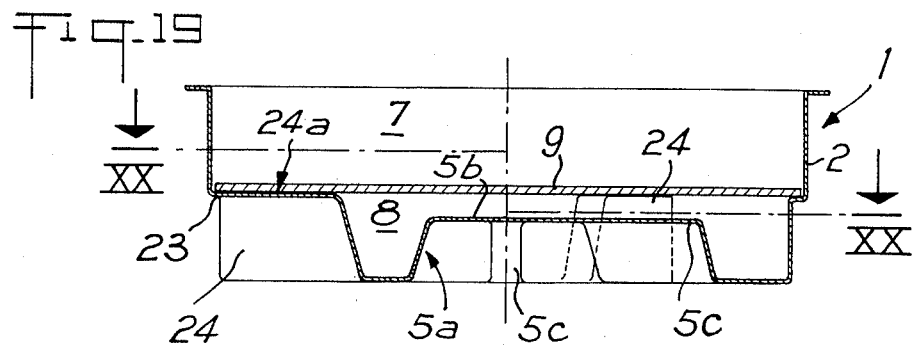
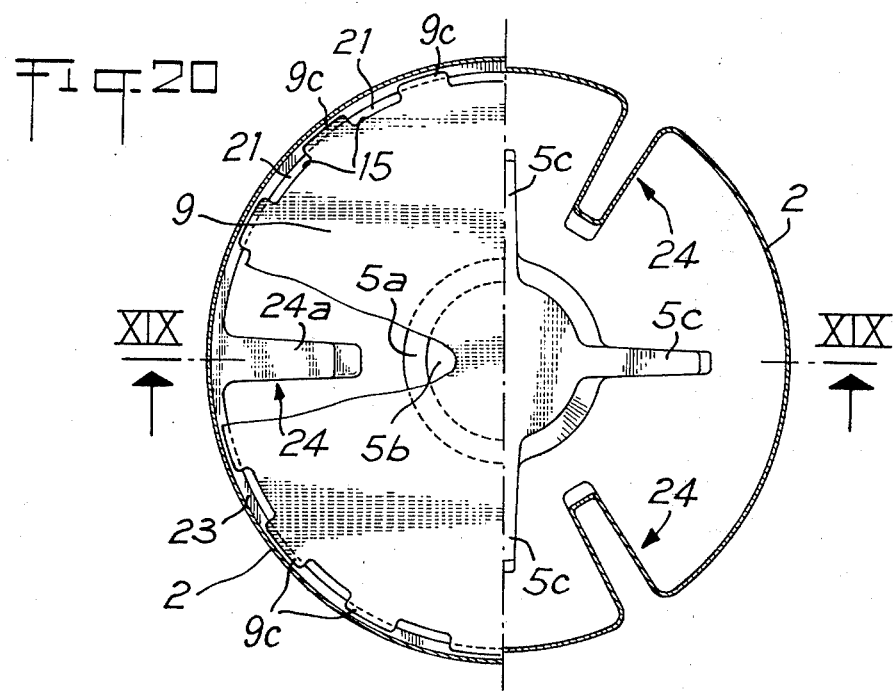
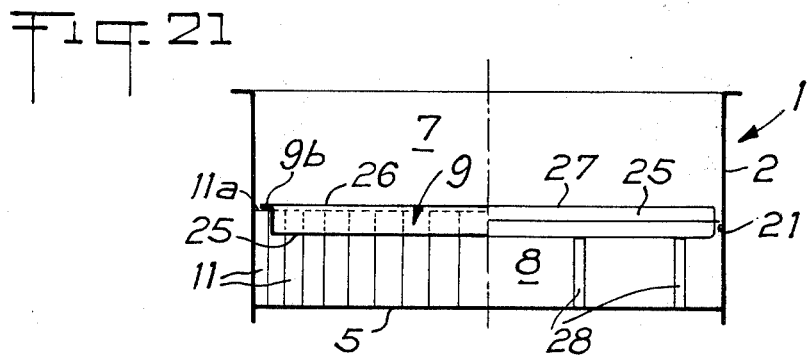

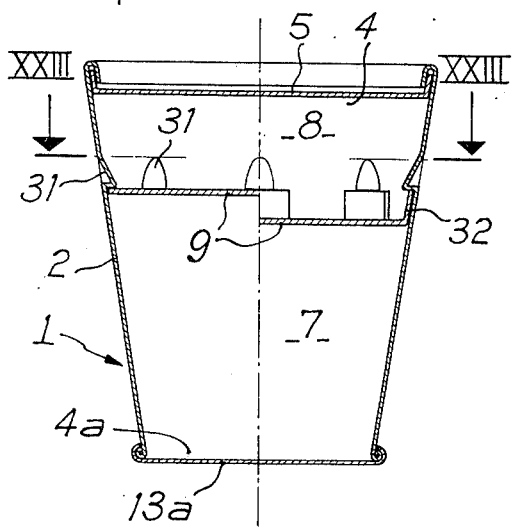
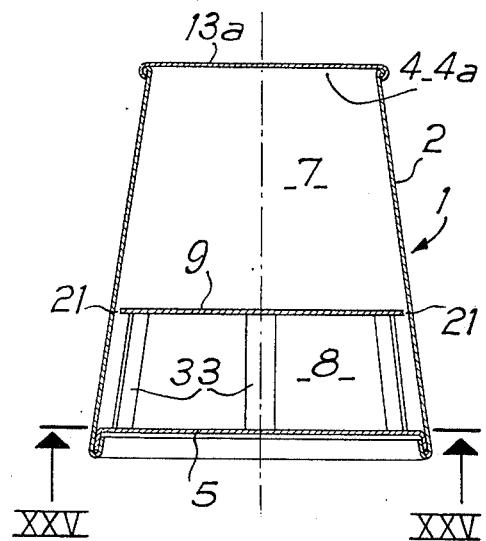
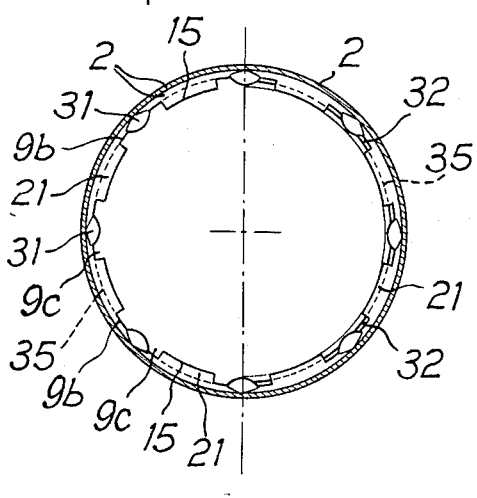
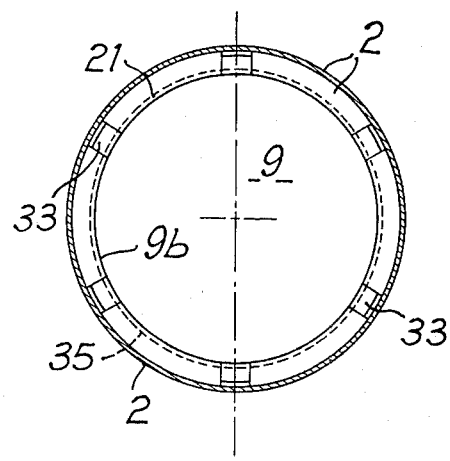

PROCESS AND APPARATUS FOR THE MANUFACTURE OF WHITE CHEESE OR YOGHURT

This invention relates to the manufacture of white cheese or yoghurt.

It has been proposed hitherto to manufacture white cheese or yoghurt by coagulating milk, optionally containing rennet, ferments, etc., in a container sealed at the upper surface of the milk, followed by draining off of the curds originating from the coagulation into a container having at least a perforated base, or into a whey strainer, to separate the curd from the serum (see French Pat. Nos. 806.504 and 1,346,309).

A disadvantage with this hitherto proposed process is that it does not ensure that draining of the curd from the serum is effected under satisfactory hygienic conditions and it requires subsequent handling of the curd, such as white cheese, with a view to packing the curd, for example in individual portions or family packs.

It has also been proposed hitherto to drain the curds into whey strainers consisting either of a container with a perforated bottom, or of a container with a perforated base and side wall. After draining the curd, that is to say after removal of the serum, the packing container is either closed by a lower lid surrounding the perforated base, or the container having a perforated base and side wall is introduced into a packing container and the packing container sealed with an upper lid (see French Pat. No. 1,326,832).

This firstly requires the production of the curds and its portion-wise transfer into containers which act as whey strainers. Moreover, whey strainer-type containers must subsequently be packed in liquid-tight manner. Furthermore, it has been proposed hitherto to place a lining which absorbs residual serum in the cover since it is not possible to achieve a perfect liquid-tight seal between the container and the bottom cover over the perforated portion thereof, and the residual serum in the curd accumulates in the bottom cover. To prevent the amount of residual serum being too large, relatively long draining periods have been proposed, before the curd can be transferred into the packing container.

According to the present invention there is provided a process for the manufacture of white cheese or yoghurt, which comprises introducing a coagulatable milk composition into a container having a sealable filling aperture, a sealable removal aperture and first and second communicating chambers, the removal aperture providing access to a first of the chambers, the milk composition being introduced through the filling opening of the container until the composition is present in an amount at most equal to the volume of the first chamber, sealing the filling opening of the container, placing the sealed container in an orientation such that all the milk composition therein accumulates in or remains in the first chamber unitl the milk composition has coagulated, and changing the orientation of the container so that serum in the coagulated milk drains into the second chamber.

The present invention further provides a container for carrying out a process in accordance with the invention, the container having sealable filling and removal openings, and two communicating chambers, the chambers being defined by a side wall of the container and by a divider at least partly engaging the said side wall of the container, communication between the chambers being via passages between the said side wall and an edge of the divider, the passages being of a size which prevents coagulated milk composition from passing therethrough, and the volumes of the chambers are such that one chamber is able to contain at least a greater part of the liquid or serum in the coagulated milk composition formed in the other chamber.

In accordance with the present invention, white cheese or yoghurt can be manufactured hygienically, in individual portions or family packs, without handling of the curds.

Thus it is possible to make white cheeses in the final packing container, the transfer of the white cheese into the packing container being unnecessary. An appreciable gain in manufacturing time can be achieved since draining the curd can take place during transport of the containers from the place of manufacture to the place of consumption. Moeover, this manufacturing process is particularly well adpated to series production, as the filling of sterile containers is effected with clean milk, and not with white cheese, and the metering of liquids such as milk can be carried out industrially with much greater accuracy than that of pastes such as white cheese. The keeping time of the cheese is also in general lengthened, as the cheese is in a perfectly air-tight enclosure.. Moreover, as the serum or the liquid in general is drained from the curds it accumulates in a second chamber communicating with the white cheese, and it retains a certain degree of moisture without being drowned therein.

The present invention can be used not only to make white cheese, but also yoghurt. Indeed, with a view to reducing the amount of serum present in yoghurt pots, it is not necessary to use ordinary milk as the raw material, and, indeed, concentrated milk, or ordinary milk and powdered milk, can be used, so that the serum formed during reaction between the milk and the ferments is bound. However, milk in concentrated or powder form substantially increases the cost and alters the taste of the resulting yoghurt. The present invention lends itself particularly to the making of yoghurt from a raw material which is exclusively ordinary milk, as the serum which forms is able to drain into a second chamber in the container. It can, however, be used to make yoghurt from concentrated milk or powdered milk as raw materials.

It has beem proposed in the hereinbefore mentioned French Pat. No. 1,326,832 to use a container having communicating chambers. The second chamber in such containers is much too small to contain the amount of serum released from the volume of curds which could fill the first chamber. In addition, perforations in the bottom of the first chamber are in a central portion thereof, and they rapidly become clogged by the curd so that separation of the curd from the serum becomes impossible. In a second embodiment, the first chamber for the curd is bounded not only by a perforated bottom but also by a perforated side wall having perforations in the vicinity of the bottom, the perforated portion of the side wall being surrounded by the second chamber. However, the side perforations become clogged by curd if milk is allowed to coagulate in the first chamber. In addition, curd would form in the second chamber, namely in the portion surrounding the perforated portion of the side wall of the first chamber. As a result, such containers would hold both curd and practically all the serum in the first chamber if they were used to effect a process in accordance with the present invention.

The present invention also provides a container which can be used both for the manufacture and packing of white cheese or yoghurt, and this enables the curd to be efficiently drained and satisfactorily fresh on reaching the consumer. The disposition of the passages between the side wall of the container and the divider utilises the natural behaviour of the curd, and the expressed serum flows through the constriction between the side wall of the container and the bulk of the curd.

Milk produced in the winter contains more serum than milk produced in the summer, the latter being richer in fats. This natural phenomenon results in differing amounts of serum being produced in the same size and shape of containers, according to the season of the year.

The present invention, however, enables the volume within the container for receiving the serum to be altered, without altering the volume in the chamber for containing the curd.

This can be effected by making more or less sizeable portions of the side wall of the containers, portions of wall associated with the bottom chamber, and/or at least a greater or lesser portion, preferably in a central region thereof, extend inwardly of the container, close to a central portion of the divider.

Thus, it is possible to vary the volume of the chamber of the container for receiving the serum, without altering either that of the other chamber or that in which the container fits. This makes it possible to retain the same dimensions for packs of groups of containers, and to present the same quantity of white cheese or yoghurt in the same volume chamber, in spite of seasonal variations in the amount of serum in the milk used for the production of the white cheese or yoghurt Embodiments of containers in accordance wth the invention will now be described, by way of example, with reference to the accompanying diagrammatic drawings in which:-

FIG. 1 is a perspective view of a vertical section through a first embodiment;

FIG. 2 is a vertical section through a modification of the first embodiment, showing a divider therein;

FIG. 3 is a vertical section through a second embodiment;

FIG. 4 is a vertical section through a third embodiment on line IV—IV of FIG. 5, with a divider therein;

FIG. 5 is a plan view of a horizontal section on line V-13 V of FIG. 4, the divider having been removed;

FIG. 6 is a vertical section through a fourth embodiment on line VI—VI of FIG. 7, with a divider therein;

FIG. 7 is a plan view of a horizontal section on line VII—VII of FIG. 6, the divider having been removed;

FIG. 8 is a vertical axial section through a fifth embodiment, having a suspended divider;

FIG. 9 is a plan view of the divider in FIG. 8;

FIG. 10 is a vertical section through a sixth embodiment on line X—X of FIG. 11;

FIG. 11 is a plan view of the horizontal section on line XI-13 XI of FIG. 10;

FIG. 12 is a vertical section on line XII—XII of FIGS. 13 and 14, through a seventh embodiment;

FIG. 13 is a plan view of a horizontal section on lines XIII—XIII of FIGS. 12 and 14;

FIG. 14 is a vertical section on lines XIV—XIV of FIGS. 12 and 13;

FIGS. 15a to 15f show various stages in effecting a process in accordance with the invention using a container in accordance with one of the embodiments of FIGS. 1 to 11;

FIGS. 16a to 16d show various stages in effecting a process in accordance with the invention using a container as shown in FIGS. 12 to 14;

FIG. 17 is a vertical section on line XVII—XVII of FIG. 18;

FIG. 18 is a plan view of a horizontal section on line XVIII—XVIII of FIG. 17;

FIG. 19 is a vertical section on line XIX—XIX of FIG. 20, the left-hand and right-hand halves of this FIG. representing two different embodiments;

FIG. 20 is a horizontal section on line XX—XX of FIG. 19;

FIG. 21 is a vertical section through an embodiment having a floatable divider, the left-hand and right-hand halves of this FIG. showing two different embodiments of divider;

FIG. 22 is a vertical axial section through a container in the shape of a truncated cone, the left-hand and right-hand halves of the FIG. showing two different embodiments of divider;

FIG. 23 shows a plan view of a horizontal section on line XXIII—XXIII of FIG. 22, the left-hand and right-hand halves of this FIG. showing two different embodiments of divider;

FIG. 24 is a vertical section through a truncated coneshaped embodiment with a further embodiment of divider; and FIG. 25 is a section on line XXV—XXV of FIG. 24 in the direction o the arrows.

Containers 1, as are illustrated in the drawings, are in general in the shape of a truncated cone, a cylinder, a cylinder-truncated cone, a parallelepiped, a pyramid etc. The outer shape of the container 1 is of little importance, but side wall 2 thereof will usually be inclined to the vertical by not more than 45°1 . The containers preferably have side walls which are vertical or only slightly inclined to the vertical. Containers 1 have a side wall 2 with an outwardly-directed edge 3 at its upper end, defining a filling opening 4, and a bottom 5, for example plane or turned in, connected in liquid-tight manner to wall 2, preferably by being integral with the side wall 2. The filling opening 4 coincides in the present case with the removal opening, that is to say the opening through which the consumer removes the curd or white cheese from the container 1. The inside of the container 1 is divided into two chambers 7 and 8 which are either one above the other (FIGS. 1 to 11) or juxtaposed (FIGS. 12 to 14). The chambers are separated by a divider 9 connected to the side wall 2, and optionally to the bottom 5 (FIGS. 12 to 14) of the container 1. The chambers 7 and 8 are in communication with each other, at least along the side wall 2, by means of passages 10.

In FIGS. 1 to 5, the passages 10 are in the form of radial slots in a bottom portion of the containers 1, and they extend between chambers 7 and 8. The passages 10 can be formed during manufacture of the containers, especially when they are of a thermo-formable material, particularly, a thermoplastics material. In FIG. 1, projecting portions 11, which form wall portions between adjoining passages 10, are less inclined from top to bottom than the bottoms of the passages 10. In several horizontal planes perpendicular to the axis of the container they have grooves 12 formed during manufacture of the container 1. The grooves 12 in any one plane are adapted to receive the edge of a divider 9. Divider 9 is a solid disc with a continuous circular edge. Grooves 12 space divider 9 from the bottom of the passages 10 by a predetermined distance. The use of grooves 12 in different horizontal planes enables the volumes of chambers 7 and 8 to be varied by engaging the divider 9 in grooves in different planes. By varying the volumes of chambers 7 and 8, the same container 1 can be used for making white cheeses with different degrees of draining, determined in practice by the duration of draining.

Non-perforated dividers 9 are preferred, as perforations can quickly become clogged by the curd, and the curd could, in addition, pass through these perforations when the white cheese is being consumed. The space between the bottom of passages 10 and the peripheral edge of divider 9, and the width of the passages 10 measured radially of the container 1, are selected such that gelled white cheese cannot pass therethrough under its own weight.

In FIG. 2, the container 1 has an upper slightly truncated, cone-shaped portion, the smaller diameter base being followed by a cylindrical portion 1b consisting of alternate passages 10 and inwardly projecting ribs 11. The passages 10 and the ribs 11 are vertical and parallel to the axis of the container 1. The ribs 11 have grooves 12 therein, the grooves being in two superimposed horizontal planes. Grooves 12 are for receiving the edge of the divider 9 and they space the divider 9 from the bottoms of the various passages 10. The passages 10, as seen from the outside of the container 1, form ribs. Ribs 11, as seen from the outside of the container, form indentations when the container is of a sheet of thin-walled thermoplastics material. The upper ends of ribs 11 are defined by shoulders 11a which are integral with the side wall 2 of the container 1. The top of the container 1, is closed by a cover after filling, perferably by a sheet 13 with a liquid-tight seal to rim 3 or the container.

The container 1 shown in FIG. 3 has two cylindrical portions 1c and 1d. Upper porton 1c is of larger diameter than lower portion 1d. Divider 9 rests on an internal shoulder 1e connecting portions 1c and 1d. Inclined passages 10 start from the bottom of the walls of portion 1c, dividing internal shoulder 1e, and they open out below divider 9 into portion 1d which defines the lower chamber 8. Chamber 8 has a recessed bottom 5. The internal shoulders 1e have engagement bosses 14 which project relative to the internal edge of the shoulders 1e, and they serve to restrain divider 9 against upward movement. All the elements of the container 1 are of a thermoplastics sheet material, and they have, particularly bosses 14, sufficient elasticity to enable the divider 9 to be positioned using slight pressure.

In FIGS. 4 amd 5, the container has an upper, truncated cone-shaped portion 1a and a lower cylindrical portion 1b. The general outline of portion 1b is defined by an alterate succession of vertical passages 10 and ribs 11. The ribs 11 connect at their upper ends to internal shoulders 1e. Shoulders 1e are in the form of crenellations and they have support faces 1f with retaining lugs 1g. The divider 9 rests on the support faces 1f, and the retaining lugs 1g of the shoulders 1e prevented it from being lifted.

FIGS. 6 and 7 show an embodiment in which the container 1 is of truncated-cone shape, and at a distance from bottom 5, it has several inwardly extending support ribs 11 in the side wall 2 of the container 1. The upper, flat, horizontal surface of ribs 11 forms a support face 1f for the divider 9. The peripheral edge of divider 9 has notches 15 therein which do not coincide with ribs 11. Notches 15 coincide with passages 10 and provide communication between chambers 7 and 8. Retaining bosses 14 in the side wall 2 above divider 9 prevent the divider from becoming dislodged when the container 1 is turned upside down.

In FIG. 8, a container 1 is shown with a divider 9 which has notches 15 (FIG. 9) therein which in combination 2 of the container 1 define passages 10 between chambers 7 and 8. Divider 9 also has a suspension tongues 16, upper end portions 16a of which being curved outwardly and located in an annular recess 3a in the rim 3 of the container 1. The length of tongues 16 determines the respective volumes of chambers 7 and 8 for a given height and shape of container 1. In addition, when the rim 3 is covered with a sealing sheet 13, tongues 16 hold divider 9 in place, even when container 1 is inverted. Tongues 16 enable the white cheese to be removed from the container 1, provided the cheese has a suitable consistency.

FIGS. 10 and 11, show a container with means for fixing a divider 9. As in FIGS. 8 and 9, fixing of divider 9 in container 1 is by tongues 16, the bottom end portions 16b of which being integral with a circular disc which performs the dividing function. The upper end portions 16a are curved outwardly and are located in an annular recess 3a in the rim 3 of the container 1. A sealing sheet 13 welded to rim 3 prevents axial movement of divider 9, portions 16a of tongues 16 being confined between the rim 3 and the sheet 13. In contrast to the embodiment of FIGS. 8 and 9, the divider 9 has a disc-like region with a continuous edge 9a, and the tongues 16 are integral with the disc and project radially with respect to edge 9a. Tongues 16 thus act as distance pieces, and they determine the width of passages 10 between wall 2 of container 1 and edge 9a of the disc 9. The lengths and inclinations of the tongues 16 are such that the tongues 16 lie flat on the wall 2, and such that the widths of passages 10 are equal to the thickness of the tongues 16.

The cross-sections of the containers 1 are not limited to circular shapes, and they can be polygonal, for example rectangular, and the side walls thereof then define pyramidal or parallelepipedic volumes.

FIGS. 12 to 14 show a container with a rectangular cross-section. It has vertical walls 2a and 2b (FIG. 13). Bottom 5 and sealing sheet 13, which is tightly sealed to rim 3 of the container 1, are parallel and substantially perpendicular to the side walls 2a and 2b. Container 1 has two adjacent chambers 7 and 8 of different volumes, the chambers being separated by a divider 9 perpendicular to bottom 5, and in the present case parallel to the shorter walls 2b. Alternatively, divider 9 can be parallel to longitudinal walls 2a. On each longitudinal wall 2a, and possibly on bottom 5 within container 1, is at least one retaining element 17, integral with the walls 2a and the bottom 5. Elements 17 each have a groove 12 therein which, with the grooves in the other elements 17, defines a plane perpendicular to the longitudinal walls 2a and to the bottom 5. The bottoms of the grooves 12 in the retaining elements 17 are spaced from the inside faces of the longitudinal walls 2a, and they determine the width of the passages 10 between the walls 2a and the divider 9, which in this embodiment is rectangular. The retaining element 17 associated with bottom 5, and the passages 10 resulting from it, do not substantially promote draining of the curds in larger chamber 7. However, it facilitates the passage of liquid, that is to say milk, from the smaller chamber 8 towards the larger chamber 7 when container 1 is on its side, with side wall 2b of larger chamber 7 downwards (see FIGS. 16b and 16c).

FIGS. 15a to 15f and 16a to 16d show different stages in the making of white cheese using a process in accordance with the present invention, two different types of containers being shown.

When container 1 is in the shape of a truncated cone, it is filled first of all with milk L containing rennet, ferments or other similar agents, so that the volume of milk $V_1$ in the container corresponds to volume $V_1$ of the larger chamber 7 for containing the subsequently produced curd. Part of the milk passes from chamber 7 into chamber 8 through passages 10. The divider 9 is at a distance from the bottom 5 such that the volume $V_2$ of chamber 8, which is smaller that that of chamber 7, is sufficient to collect at least the greater part of the liquid or serum which is released by the curds which form in chamber 7. As a result, the free volume in the container 1 above the level of the milk is equal to the volume $V_2$ of the chamber 8. Once container 1 has been filled (FIG. 15a), it is sealed in liquid-tight manner, for example with a sealing sheet 13 (FIG. 15b). The container 1 is then inverted, so that it rests on sealing sheet 13, before milk L begins to coagulate. In the inverted position of the container (FIG. 15c), all the milk L collects in chamber 7 between the divider 9 and the sealing sheet 13, by flowing from chamber 8 into chamber 7 through passages 10. As the volumes of chamber 7 and the milk L are identical, no milk remains in chamber 8. The container 1 is then left in this inverted position until the milk has coagulated and converted into curds C (FIG. 15d) which contract and move away from the side wall 2 of the container 1. The container 1 is then returned to its normal position (FIG. 15e) to effect separation of the curd from the serum S which drains along the wall 2 through passages 10 and into the lower chamber 8. Curd C is retained in the upper chamber 7 by the divider 9. Container 1 can be stored in this position, with the curd C in chamber 7 above the divider 9. However, it can be immediately distributed towards places where it is to be consumed, final draining being effected during transport and/or storage of the containers 1 unitl the chamber 8 is completely full of serum S (FIG. 15f).

The various stages in the manufacture of white cheese with the aid of a container as shown in FIGS. 12 to 14 are similr to those which have just been described in relation to FIGS. 1 to 11. Milk L is placed in the container 1 (FIG. 16a) in an amount slightly less than the volume of the container 1. Using sheet 13, the container 1 is placed in a practically vertical position so that side wall 2b of chamber 7 is at the bottom and the milk L is able to flow from chamber 8 into chamber 7 through passages 10 (FIG. 16b). The container 1 is held in this position unitil the milk has been converted into curds C (FIG. 16c). The container 1 is then returned to its normal position, in which it rests on bottom 5 (FIG. 16d). In this position, serum S expressed from curd C' accumulates first on the edges of chamber 7 and then reaches the chamber 8 through passages 10. The level of serum S in the two chambers 7 and 8 adjusts itself by communication between the vessels. This processing method is especially interesting when it is desired to obtain a relatively wet cheese, as part of the curd C' lies permanently in the serum S which can be removed just before consumption by tilting the container 1 downwardly towards chamber 8, after removal of the sealing sheet 13.

The various parameters relating to the processing of the milk to make white cheese or yoghurt do not constitute essential features of the present invention. A few indications as to the parameters which can be used will, however, be given.

Microorganisms for effecting the process are advantageously 0.5 to 3% by volume of non-gasifying strains of *Streptococcus lactis* and/or *Streptorcoccus cremoris* and/or *Leuconostocus citrovorum*. It is preferred to use 10/1000 rennet at the rate of 1 milliliter for each 100 liters of milk. It has been observed that at ambient temperature (18° to 25° C) a curd usually forms in at least 24 hours, and can even form in 12 hours. After treatment at ambient temperature, the containers and their contents are rapidly cooled so that the white cheese or yoghurt rapdily reaches a temperature of the order of 5° C over a period of 1 to 3 hours. This sudden cooling promotes release of the serum as a result of contraction of the curd due to the cooling. It has been observed that once curdling is over, the evolution or degradation of the curd or white cheese, or yoghurt in the sealed containers stops, or is at least considerably slowed down, so that the contents of the containers can be kept for 2 to 3 months, according to the storage temperature. This ability to be stored for long periods is probably due to the lack of oxygen in the tightly-sealed containers.

Container 1 shown in FIGS. 17 and 18 has an upper chamber 7 with opening 4 therein and a lower chamber 8 with a bottom 5. Chamber 8 is separated from chamber 7 by a divider 9. Lower chamber 8 has a corrugated side wall 2a. Wall 2a, for example as seen from the inside of the container, has an alternating array of vertical passages 10 and vertical ribs 11 extending for the height of the bottom chamber 8. The bottom 5 of the container 1 (right-hand side of FIGS 17 and 18) has a central recessed portion 5a, the upper face 5b of which preferably being at least at a small distance from the divider 9 which rests on the shoulder 11a defining the upper end of the vertical ribs 11. Divider 9 is held in position by a series of internal projections or bosses 14 in a part of wall 2 associated with the upper chamber 7. A central portion of the divider 9 advantageously contacts upper face 5b of the central recessed portion 5a of the bottom 5 of the container 1.

As can be seen from the left-hand side of FIGS. 17 and 18, the recessed portions of the bottom 5 do not have to be centrally disposed in order to reduce the internal volume of chamber 8. As illustrated, the recessed portions of the bottom 5 are formed by projections 5c extending inwardly from the bottom 5, that is to say from the lower surface of the container 1, into the interior of the bottom chamber 8. These projections 5c are disposed for example radially with respect to the axis of the container 1, and they may even extend on both sides, on the one hand as far as the axis of the container and on the other hand as far as the side wall 2a which can be omitted where the projections 5c occur. Between peripheral edge 9b of the divider 9 and the upper portion of the wall 2 of the container 1 is a gap 21 through which the serum in the upper chamber 7 can drain into the lower chamber 8.

FIGS. 19 and 20 show a container with a height smaller than its diameter, and it has recessed portions in its bottom 5a.

On the left-hand side of FIGS. 19 and 20, at the junction between upper chamber 7 and lower chamber 8, is a continuous, annular, internal shoulder 23 which serves as a bearer surface for peripheral teeth 9c on the divider 9. The bases of the notches 15 between successive teeth 9c on the divider 9 are spaced from the annular internal shoulder 23 such that the resulting gaps 21 form communicating passages between chambers 7 and 8.

On the left-hand sides of FIGS. 19 and 20, the recessed portions are horizontal ribs 24, which extend from a lower portion 2a of the wall 2, and peripheral portions of the bottom 5 of container 1. Ribs 24 extend radially, for example as far as a central portion of bottom 5. The ribs 24 are equal in height to the bottom chamber 8, so that their upper faces act as support faces 24a for the divider 9. The width of support faces 24a can be selected as desired, and they can be sufficiently narrow that faces 24a resemble line peaks extending along horizontal extensions of the internal shoulders 23. The lengths, numbers and thicknesses of the ribs 24 enable the volume of the bottom chamber 8 to be altered to a great extent. The ribs 24 are preferably distributed uniformly, for example staggered relative to one another by 60° to 90°.

On the right-hand sides of FIGS. 19 and 20 are shown a combination of a central recessed portion 5a with projections 5c extending from the bottom end of container 1, and from the side wall of the recessed bottom 5a, projections 5c extending like the arms of a star towards the periphery of the container 1. Projections 5c are the same height as the central recessed portion 5a, and they are spaced at regular intervals from each other. Where the container 1 has projections 5c and support ribs 24, projections 5c preferably alternate relative to ribs 24, and are preferably on the bisectors of the angles between two adjacent ribs 24.

The central recessed portion 5a and the projections 5c can be used to reduce the useful internal volume of the bottom chamber 8, and they can also be used to support the divider 9, the ribs 24 also serving as supports for the divider. The different volumes occupied by the recessed bottom, the projections, and the support ribs (diameter of the recessed portion, thickness, and number of the branches and projections) enable the volume of chamber 8 to be varied, and thereby the volume of serum which can be collected. Furthermore, the degree of moisture in the cheese in chamber 7 can be varied without the volume defined by the overall outline of the container being altered.

The divider 9 can be such that it floats in the liquid in container 1. Thus, it is not necessary to secure the divider 9 rigidly in the container 1. Indeed, the divider 9 can float, fixing then being achieved by the divider engaging the shoulders, or by the intermediate pieces being integral with the walls of the container and resting on the bottom of the container. As a result of the upthrust resulting from the liquid in the container when the container is in an inverted orientation, or under gravity with a weight of curds resting on the divider, in the normal position. The floating divider may be of a material with a specific gravity lower than that of the liquid in the container 1. However, the divider 9 can also be hollow, and thereby be caused to float. A floating divider may be in the form of a flat cup of thermoplastics material tightly covered by a sheet or by a second, flat cup. These alternatives are shown respectively in the left-hand and right-hand portions of FIG. 21. Bottom cups are shown at 25, a sheet at 26, and a second cup at 27. The bottom cup 25 can have support legs 28 which rest on the bottom 5 of the container, and replace the internal shoulders 11 or 11a at the join between chamber 7 and 8 of the container 1. The cups 25 and 27, and optional sheet 26, are of a thermoplastics material and are welded together at their edges. These edges 9b in shape of a ring which, with the side wall 2 of the container 1 defines passages 21 between chambers 7 and 8. Edges 9b can have notches therein, similar to those shown in the lef-hand portion of FIG. 20.

The floating divider 9 is introduced into the container 1 only after the container has been filled with the liquid. The container 1 is closed in liquid-tight manner, and it is then upturned. The floating divider 9 then rises through the liquid to come to rest either against the bottom 5, through the feet 28, or against internal shoulders 11a or 23, through edge 9b.

The container 1 shown in FIGS. 22 and 23 has a truncated cone-shaped side wall 2 with small cone angle. The small truncated base of the cone, which is defined by the side wall 2, is normally situated at the top of the container 1. It may, however, form the bottom of the container during manufacture thereof particularly while it is being filled. The container 1 has a removal opening 4a which can be closed hermetically by a cover 13a made, for example, from a sheet of aluminium. The container 1 also has two superimposed chambers 7 and 8 therein, separated from each other by a divider 9. Level with divider 9 are a number of internal bosses 31 which extend into chamber 8. Bosses 31 each have a support surface, the surfaces of the various bosses 31 being in the same plane and perpendicular to the axis of the container 1. The divider 9 is a ciruclar disc with regularly spaced notches 15 around its periphery. The disc has a diameter slightly larger than the diametrical distance between the bosses 31, and a radial depth greater than that of the bosses. The distribution of the bosses and notches is uniform, and such that two neighbouring bosses and two neighbouring notches include the same angle relative to the axis of the container 1. The diameter of the peripheral edge 9b of the divider 9 is identical to, or smaller than, the internal diameter of the chamber 7, the diamter being taken on a section through the chamber 7 in the immediate vicinity of the bosses 31.

After divider 9 has been set in position in container 1, edge 9b of divider 9 bears on the side of chamber 7 against wall 2 of container 1, wall 2 then acting as a retaining abutment, and it rests on the side of chamber 8 on internal bosses 31.

Mounting of divider 9 is effected as follows: the divider 9 is first placed in chamber 8 so that bosses 31 enter notches 15, and divider 9 can pass into chamber 7 where it contacts wall 2. Divider 9 is then rotated about the axis of container 1, until each of the teeth 9c between adjacent notches 15 coincides with a boss 31. Substantial axial movement of the divider 9 is then prevented, either by wall 2 or by the bosses 31 (see left-hand side of FIGS. 22 and 23).

In FIG. 22, the larger base of the truncated wall 2 of the container 1 acts as a filling opening 4 which is subsequently sealed tightly by an inserted bottom 5. Bottom 5 is generally flat, and it has a curved edge crimped in a folded-down end portion of the side wall 2. Instead of being flat, the inserted bottom 5 can have a central portion 5a, such as is shown in FIGS. 17 to 20, which enters chamber 8 and possibly act as a support for the divider 9 instead of using the bosses 31. The inserted bottom 5 can also have support ribs 24, as shown in FIGS. 19 and 20. After filling the container 1 in the position represented in FIG. 22, filling to the level of divider 9, and crimping the inserted bottom 5 (that is after sealing of the filling opening 4), the container 1 is left in this position until the seeded milk in chamber 7 has curdled. Container 1 is then inverted, and after draining off the serum, its contents are removed through opening 4a, after having first removed cover 13a. In FIGS. 22 to 25, the radial depth of the notches 15 determines the width of the gaps or passages for communication 21 between chambers 7 and 8. These passages are defined by the bases of the notches 15, and by the internal face of the side wall 2. The part of the wall level with divider 9 is indicated by broken line 35.

The volumes of chambers 7 and 8 can be varied without modifying the positions of bosses 31. In order to avoid pivoting divider 9, the periphery of the divider can have support legs 32 which have a certain amount of elasticity. Legs 32 are curved towards the inserted bottom 5, and they extend radially outwardly. The legs 32 rest and resiliently engage horizontal support faces of the bosses 31, after having passed thereover, when divider 9 abuts side wall 2. Advantageously, instead of notches 15 in divider 9, the support legs 32 can project radially to form spacer elements which, as a result of their thickness, determine the radial width of passages 21 between chambers 7 and 8 (see right-hand halves of FIGS. 22 and 23, as well as FIGS. 24 and 25).

In FIGS. 24 and 25, the side wall 2 of container 1 is completely smooth, and divider, 9 abuts the internal face of side wall 2 and rests on bottom 5 through support legs 33. Instead of notches 15, it is possible to use the thickness of the support legs 33 projecting radially from edge 9b to make and determine the width of passages 21 between the chambers 7 and 8. When container 1 is filled in the orientation shown in FIG. 24, openings 4 and 4a are the same, and sealed by the one cover 13a. After filling, the container 1 with the milk to be coagulated is placed in the orientation which enables the milk to accumulate in chamber 7 adjacent opening 4a. After curdling of the milk, container 1 is inverted so that the serum drains into the chamber 8 and onto bottom 5.

Although the process hereinbefore specifically described has been given in relation to natural milk, it will be appreciated that it can be used with synthetic milk compositions, for example derived from vegetable protein such as soya protein.

I claim:

1. A container for use in the manufacture of white cheese or yoghurt, which comprises a container having a side wall defining a sealable filling opening through which a coagulatable milk composition may be introduced into the container, a sealable removal opening, and first and second communicating chambers in the container respectively located adjacent said filling and sealing openings, and a divider having an edge at least partly engaging the side wall of the container and dividing the container into the two chambers, the edge of the divider having a predetermined configuration selected to cooperate with the side wall of the container to define passages therebetween providing communication between said chambers, of a predetermined size to prevent coagulated milk composition from passing therethrough; seal means for sealing the filling opening of the container after a milk composition has been introduced into the container in an amount at most equal to the volume of the first chamber, whereby said container may be placed in an orientation such that all the milk composition therein accumulates and remains in the first chamber until the milk composition has coagulated, and the volumes of said first and second chambers being respectively selected such that said second chamber is able to contain at least a greater part of the liquid or serum in the coagulated milk composition formed in the first chamber when the orientation of the container is changed, after coagulation of the milk composition in the first chamber, to permit said serum to drain from the caogulated milk composition and flow through said passages into said second chamber.

2. A container according to claim 1, wherein the chambers are of different capacities.

3. A container according to claim 1, wherein the said side wall has ribs therein which with the divider define said passages.

4. A container according to claim 1, wherein the side wall has a series of grooves therein, the grooves defining a plane parallel and engaging the edge of the divider.

5. A container according to claim 1, wherein the container has an upper rim and the divider includes suspension tongues with curved end portions, the end portions engaging said rim.

6. A container according to claim 1, wherein the container has a bottom and retaining elements integral with the side walls, and said divider is perpendicular to the said bottom of the container and parallel to at least one side wall thereof, the divider being spaced from the side walls of the container by the retaining elements, and defining the communication passages between the edge of the divider and the corresponding side wall of the container.

7. A container according to claim 1, wherein the container has a bottom with at least one recessed portion extending into one of the chambers and near to a central portion of the divider.

8. A container according to claim 1, wherein the divider is of a material which floats.

9. A container according to claim 1, wherein the container has a bottom, and the side wall is of truncated cone with a smaller top and a larger base, the base forming the bottom of the container, an annular portion of the side wall of the container acting as a retaining abutment for the divider to retain the divider in the direction of the removal opening of the container.

10. A container according to claim 1, wherein the container has a bottom, the side wall defines a shape selected from the group consisting of truncated conical and truncated pyramidal, and the chamber defined by the divider and the bottom of the container has support bosses of small radial dimension which define a single plane perpendicular to the axis of the container, and the divider rests partly on the bosses.

* * * * *